April 17, 1962   L. H. ROMANSKI   3,029,892
AUTOMATIC AUTOMOBILE SAFETY DOOR LOCK
Filed Jan. 6, 1958   3 Sheets-Sheet 1
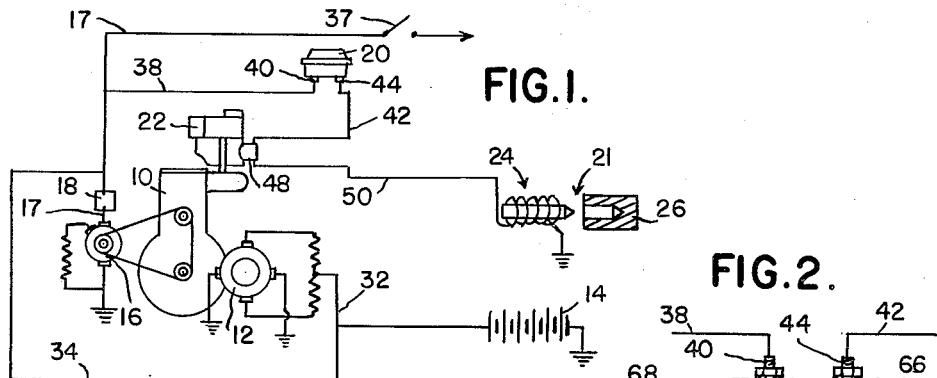
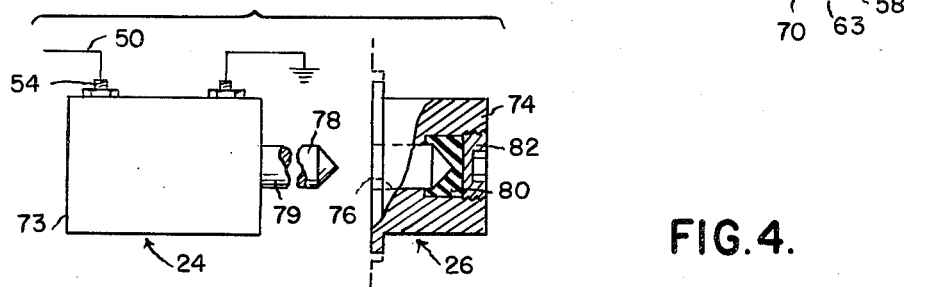
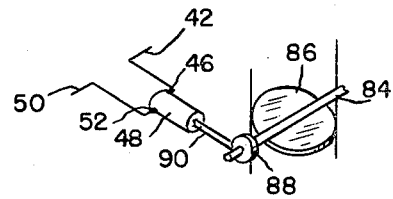
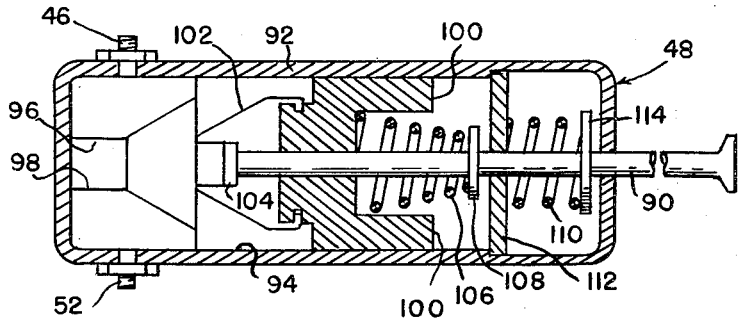
INVENTOR.
LON H. ROMANSKI
BY Whitemore,
Hulbert & Belknap
ATTORNEYS April 17, 1962  L. H. ROMANSKI  3,029,892
AUTOMATIC AUTOMOBILE SAFETY DOOR LOCK
Filed Jan. 6, 1958  3 Sheets-Sheet 2

INVENTOR.
LON H. ROMANSKI
BY Whittemore,
Hulbert & Belknap
ATTORNEYS

April 17, 1962 L. H. ROMANSKI 3,029,892
AUTOMATIC AUTOMOBILE SAFETY DOOR LOCK
Filed Jan. 6, 1958 3 Sheets-Sheet 3

INVENTOR.
LON H. ROMANSKI
BY Whittemore
Hulbert & Belknap
ATTORNEYS

United States Patent Office 3,029,892
Patented Apr. 17, 1962

3,029,892
AUTOMATIC AUTOMOBILE SAFETY DOOR LOCK
Lon H. Romanski, Detroit, Mich., assignor to Holley Carburetor Company, Van Dyke, Mich., a corporation of Michigan
Filed Jan. 6, 1958, Ser. No. 707,269
3 Claims. (Cl. 180—82)

The present invention relates generally to automobile door locks and more particularly, to automatically operated auxiliary locks designed to prevent opening of the automobile doors when the automobile is in motion.

In the past it has been found that one of the factors contributing to fatalities resulting from automobile accidents has been the fact that the automobile doors are opened by the impact. When this occurs the passengers may be thrown out of the car and exposed to far greater danger than if they remained in the protection of its frame.

Another cause of accidents and fatalities has been the opening of automobile doors by children while the automobile is in motion.

In accordance with the present invention means are provided independently of the usual manual latch or lock, which remain locked whenever the automobile is in motion or whenever opening of the door would present a hazard.

It is an object of the present invention to provide automatically operated auxiliary lock means responsive to engine conditions and operation to lock the doors of the automobile whenever the automobile is in motion or whenever the engine speed is sufficient to maintain the automobile in motion, and automatically unlocked when the automobile stops or when engine speed falls below a predetermined minimum.

Other objects and features of the invention will become apparent as the description proceeds, especially when taken in conjunction with the accompanying drawings, illustrating preferred embodiments of the invention, wherein:

FIGURE 1 is a schematic illustration of a preferred embodiment of the invention including the necessary electrical circuit.

FIGURE 2 is a sectional view of a vacuum operated switch used in some of the modifications of the invention.

FIGURE 3 is a schematic illustration of the door lock including a solenoid actuated bolt and bolt receiving bushing or socket used in the invention.

FIGURE 4 is a fragmentary perspective illustration of a carburetor throttle shaft and throttle valve with associated cam and switch.

FIGURE 5 is a sectional view of an electrical switch used in the invention.

Figure 6:
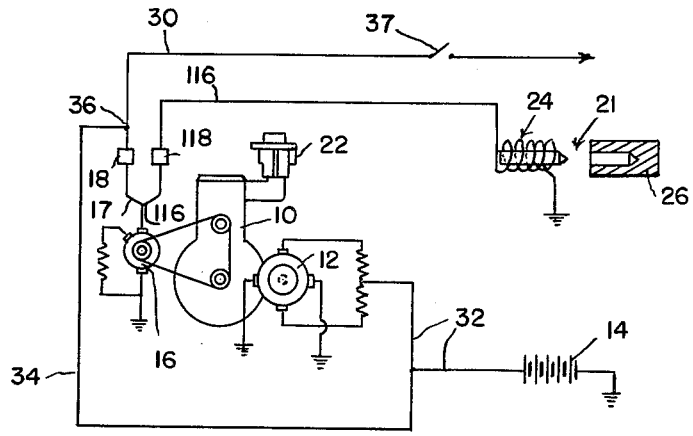
FIGURE 6 is a schematic illustration of another embodiment of the invention including the necessary electrical circuit.

Broadly described, the present invention includes an automatically operated auxiliary lock comprising a solenoid actuated bolt and a bushing or bolt receiving socket associated therewith. The solenoid is adapted to throw the bolt into engagement with its socket in accordance with predetermined engine conditions such for example as engine speed, manifold vacuum, fuel pressure where fuel injection or a pressure fuel system is employed, or the like. The solenoid is adapted when energized to advance the bolt into its socket to retain the door firmly locked. Suitable spring means are provided effective to retract the bolt when the solenoid is de-energized.

The solenoid actuated auxiliary door lock is connected to the electrical system of the vehicle as will be apparent from the description.

Referring first to the embodiment of the invention illustrated in FIGURES 1-5, the automobile engine 10 is provided with the usual electric starter motor 12 connected to the battery 14. A generator 16 is connected to the engine and adapted to be driven thereby. The generator is grounded and has an output line 17 containing an electrical relay 18. Connected to the generator output line 17 as will be described in more detail subsequently, is a vacuum switch 20 in series with the auxiliary lock indicated generally at 21. A second switch which will subsequently be described, is located adjacent the carburetor 22 so that both of the aforementioned switches have to be closed to supply current to the auxiliary lock 21, or more particularly, to the solenoid actuated bolt 24 which cooperates with the bolt receiving socket 26.

The battery 14 has parallel electrical connections 32 and 34 leading respectively to the starter motor 12 and the output line 17 of the generator. The relay 18 is located in the output line 17 between the generator and the point 36 which is the point of connection of the line 34, and the battery output line 17. The relay is of the type which prevents current flowing from the battery to the generator. The line 17 leads to the ignition circuit through the ignition switch indicated at 37. A line 38 parallel to the ignition switch 37 is connected from the generator output line 17 to a terminal 40 of the vacuum sensitive switch 20. A line 42 connects terminal 44 of the switch 20 with a terminal 46 (FIGURE 4) of the switch 48, and a line 50 connects the terminal 52 of the switch 48 with the terminal 54 of the solenoid actuated bolt 24 (FIGURE 3).

From the foregoing it will be observed that the circuit to the solenoid actuated lock is connected to the generator and includes in series two switches one of which is a vacuum sensitive switch and the other of which may be closed by an engine condition such for example as throttle setting or fuel pressure as will subsequently be described. In any case the lock indicated generally at 21 is adapted to be maintained in locked condition automatically and without attention from the operator so long as engine conditions exist which would render opening of the door hazardous. It is pointed out at this time that the switch is not actuated when the engine is running slowly under the conditions known as "curb idle" conditions. However, if the engine is being raced even though the vehicle is standing still at the curb, the doors remain locked. This prevents unauthorized opening of the door when the driver is preparing to move away from the curb, even though the vehicle is not yet in motion.

Referring now to FIGURE 2 the vacuum sensitive switch 20 is shown in detail. This switch comprises outer housing members 56 and 58 between which a flexible diaphragm 60 is peripherally clamped. Conductors 38 and 42 are connected to electric terminals 40 and 44 which project within the hollow interior of the housing portion 56. A bridging electrical conductor 62 is fastened to the central portion of the diaphragm 60 and is insulated therefrom if the diaphragm is made of conductive material. The bridging member 62 is adapted to span the inner portions of the terminals 40 and 44 when the diaphragm moves upwardly from the position illustrated in FIGURE 2. Also connected centrally of the diaphragm 60 is a a guide pin 63 extending through a guide opening in the housing portion 58. A compression spring 64 is received in the chamber 66 formed between the upper housing portion 56 and the diaphragm 60, and operates to bias the diaphragm downwardly as seen in FIGURE 2. The interior of the chamber 66 is connected to a source of vacuum such for example the throat of the venturi of the carburetor 22 by a conduit 68 in the usual manner to provide a gradually increasing vacuum pressure as engine speed increases. The chamber 70 formed between the diaphragm 60 and the housing portion 58 communicates to atmosphere through a port 72. The strength of the spring 64 is selected such that the conducting member 62 bridges the terminals 40 and 44 whenever the engine 10 is self-sustaining.

In FIGURE 3 some of the details of the auxiliary lock 21 are shown. The solenoid actuated bolt 24 includes a casing 73 containing the usual solenoid windings. The bushing or bolt receiving socket 26 comprises a body 74 having a bolt receiving cavity 76 formed substantially to the shape of the bolt portion 78 of the solenoid plunger 79. A resilient member 80 in which is formed the inner end of the bolt receiving cavity 76 is received within the body 74 and is held therein by suitable means such for example as the threaded plug 82. The member 80 may be formed of any suitable yieldable material such for example as rubber, and constitutes a stop and silencer for the bolt end 78 of the plunger 79.

Referring now to FIGURE 4 there are illustrated means for closing internal contacts of the switch 48. The switch 48 is located directly adjacent the throttle shaft 84 which carries the throttle plate 86 of the carburetor. Fixedly mounted on the throttle shaft 84 is a cam 88. The switch 48 includes an external switch actuating plunger 90 in juxtaposition to the cam 88. The cam 88 is shaped so that when the throttle is in fully closed or idling position, the plunger is allowed to move outwardly by means subsequently to be described to a position in which the circuit between its terminals 46 and 52 is broken. However, when the throttle is moved a predetermined small distance away from closed position, the plunger is cammed inwardly and the circuit is closed between the terminals 46 and 52 of the switch 48.

Referring now to FIGURE 5 there are illustrated details of the switch 48. As seen in this figure the switch comprises a housing 92 formed of a suitable insulating material and having a generally cylindrical cavity 94 therewithin. Adjacent one end of the housing are fastened the terminals 46 and 52 which at the interior of the housing have electrical contact portions 96 and 98 respectively connected to them. A piston 100 is slidably received within the cylinder and has an electrical bridging conductor 102 fixed to one end thereof. The plunger 90 previously referred to is formed of insulating material and extends through the piston 100 and has a retaining head 104 engaging against a suitably shaped seat on the conductor 102. The arrangement is such that after the bridging conductor 102 has engaged contacts 96 and 98, further inward movement of the plunger 90 is permitted without straining the parts. A spring 106 surrounds an intermediate portion of the shaft 90 and engages at opposite ends between the piston 100 and a spring retaining collar 108 fixed to the shaft 90. A second spring 110 surrounds the shaft 90 and engages between a stationary spring abutment 112 and a second collar 114 fixed to the shaft. It will be observed that under the influence of the springs, the bridging contact 102 remains in open circuit position except when forced inwardly by inward movement of the plunger 90.

The operation of the embodiment of the invention illustrated in FIGURES 1-5 will now be described. As the engine is being cranked the total supply of electrical current is from the battery 14 and the relay 18 is thus open prohibiting the current flowing from the battery into the generator. The vacuum switch 20 at this time is open since cranking of the engine does not develop sufficient vacuum to close its contacts. Therefore, no current is permitted to flow to the windings of the solenoid actuated bolt 24.

When the engine becomes self-sustaining manifold vacuum will rise to some intermediate value and the vacuum switch 20 will be closed by virtue of the vacuum communicated from the venturi through conduit 68. The engine may now be assumed to be operating at what is referred to as "curbe idle," or with its throttle closed or substantially closed. At this time the electrical circuit to the solenoid actuated bolt 24 is complete except for the switch 48 which remains open until the cam 88 is rotated a predetermined distance by corresponding opening movement of the throttle plate 86.

Therefore, it can readily be seen that as soon as the engine is accelerated preparatory to setting the automobile in motion, the position of the throttle will close the circuit through switch 48 and the solenoid actuated bolt 24 will be energized, causing the bolt portion 78 to be moved forwardly to engage in the socket 76 and thus to retain the door or doors securely locked.

When the automobile reaches "idle" condition again, the throttle shaft and valve will have assumed their idle position thereby allowing the plunger 90 to move outwardly and thus to open the circuit between the terminals 46 and 52. At this time the windings of the solenoid actuated bolt 24 are de-energized and the bolt is retracted by the action of the usual return spring provided in the solenoid.

Referring now to FIGURE 6 there is illustrated a second embodiment of the invention which differs from the embodiment previously described primarily in the elimination of the vacuum switch 20 and the throttle shaft cam switch 48. In this embodiment of the invention the electric circuit is substantially the same as shown in FIGURE 1 and like reference numerals have been applied thereto. In this case however, a line 116 is provided which extends directly from the generator output line 17 to the windings of the solenoid actuated bolt 24. The line 116 includes a relay 118 adapted to close at a lower voltage than that which is required to close the relay 18. For example, the relays may be selected such that at 450 r.p.m. of the engine, neither the relay 18 nor the relay 118 would be closed. The relay 118 may be designated to close at the voltage corresponding approximately to 500 engine r.p.m. and at and above this engine speed the relay 118 will permit the flow of current from the generator to the windings of the solenoid 24 thus maintaining the auxiliary lock in locked condition. At some higher engine speed as for example 600 r.p.m., the relay 18 closes.

From the last described embodiment of the invention it will be observed that the auxiliary lock is maintained in locked condition whenever engine speed is above a predetermined engine speed irrespective of any other condition.

Figure 7:
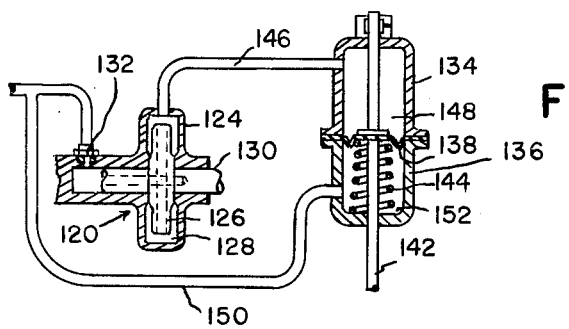
FIGURE 7 is a sectional view of a fuel pump and pressure sensitive switch actuator employed in yet another embodiment of the invention.
Figure 8:
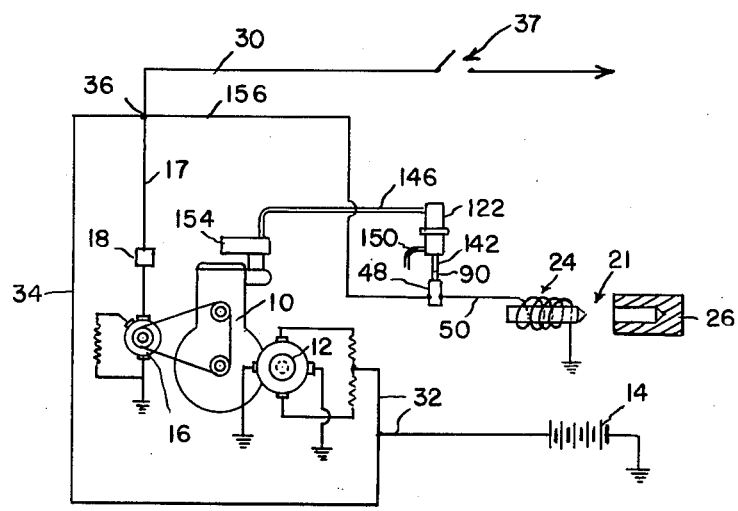
FIGURE 8 is a schematic illustration of the embodiment of the invention including the pump and switch actuator of FIGURE 7.

A third embodiment of the invention is illustrated in FIGURES 7 and 8. In the embodiments previously described the invention was described in conjunction with an internal combustion engine of the type employing a carburetor for supplying fuel mixture to the engine. In FIGURES 7 and 8 there is illustrated a modification particularly adapted for use in conjunction with a fuel injection or pressure fuel supply system.

Referring now to FIGURE 7 there is illustrated a pump 120 of the type which may be used in either a pressure fuel system or a fuel injection system, with a pressure responsive switch actuator 122 adapted to communicate with the respective pressures available at both sides of the pump.

The pump is substantially comprised of a housing 124 containing an impeller 126 in a chamber 128, an impeller shaft 130 which is driven at a speed having a constant ratio to that of the engine, and a fluid inlet port 132. The pressure responsive switch actuator 122 comprises housing members 134 and 136 between which a flexible diaphragm 138 is securely held. A shaft 142 is fastened to the diaphragm 138 and pilots in housing members 134 and 136 respectively. A spring 144 surrounds the shaft 142 and extends between the diaphragm 138 and the inner end of the housing portion 136 in such a manner as to normally bias the diaphragm and shaft 142 upwardly as seen in FIGURE 7. A conduit 146 is provided which connects the pressure chamber 128 of the pump to the chamber 148 of the switch actuator 122 while a conduit 150 transmits the pressure of the fluid supplied to the pump 120 to the chamber 152 of the switch actuator 122.

In FIGURE 8 there is shown the complete system employing the pump 120 and pressure responsive switch actuator 122 of FIGURE 7. The system includes for the most part elements included in and described in conjunction with FIGURE 1. Like reference numerals are applied to these parts and they will not be again described. In this system however, the switch 48 is positioned to have its plunger 90 actuated by the shaft or rod 142 extending from the pressure responsive switch actuator 122.

As seen in this figure the engine 10 has associated therewith a fuel supply system indicated diagrammatically at 154 which may be a fuel injection system or a pressure supply system. In either case the fuel supply system includes the pump 120 shown in FIGURE 7 having a conduit 146 extending to the pressure chamber 148 of the pressure responsive switch actuator 122. It will be apparent from an inspection of FIGURES 7 and 8 that the solenoid actuated lock 21 is maintained in locked condition so long as the fuel supply pump 120 is driven at or above a predetermined speed. The constants of the system are so selected that as the engine attains any speed greater than "curb idle," the pressure differential created by the impeller 126 is transmitted to the pressure responsive switch actuator 122, causing the diaphragm 138 and associated shaft 142 to move downwardly to engage the plunger 90 of the switch 48. When the switch 48 is closed, the solenoid is energized and the lock is maintained in securely locked relation.

Figure 9:
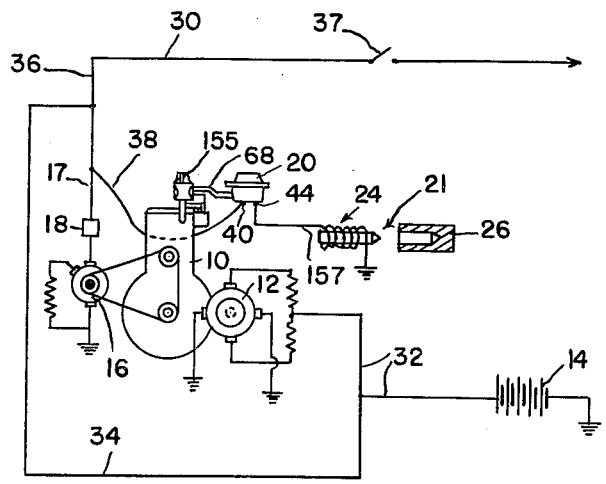
FIGURE 9 is a schematic illustration of yet another embodiment of the invention, including the necessary electrical wiring.

Referring now to FIGURE 9 there is illustrated yet another embodiment of the invention and including a system comprising many of the elements illustrated and described in conjunction with FIGURE 1. Like elements are supplied with like reference numerals and a description of these elements will not be repeated. In this embodiment of the invention the engine 10 includes the usual ignition distributor 155 which is supplied with a connection leading to the manifold of the engine for effecting a control of the spark which is dependent in part upon manifold vacuum. The conduit 68 of the pressure responsive switch 20 in this embodiment of the invention extends to an ignition distributor at a point therein which is in communication with manifold vacuum. Alternatively, if desired, the conduit 68 may extend to the throat of the venturi of the carburetor. The terminal 44 of the vacuum responsive switch 20 is in this case connected directly by line 157 to the windings of the solenoid actuated bolt 24. If as illustrated a vacuum responsive switch 20 is in communication with the source of vacuum through the vacuum take-off of the ignition distributor 155, the vacuum will be of sufficient value to close the switch 20 whenever the throttle valves of the carburetor are moved some slight amount off of "curb idle." Whenever the vacuum switch closes the circuit in this manner the solenoid will be energized causing the bolt to effect positive locking of the doors.

If the conduit 68 of the vacuum responsive switch 20 is in direct communication with the venturi of the carburetor 22, the increase in engine speed will cause a corresponding increase in air flow, thereby increasing the vacuum at the throat of the venturi in the switch 20. When this vacuum reaches a predetermined value which corresponds to a minimum engine speed above "curb idle," the switch 20 will be closed, thereby energizing the solenoid and locking the doors.

In the foregoing emphasis has been on the means for completing a circuit to the solenoid actuated bolt 24.

Figure 10:
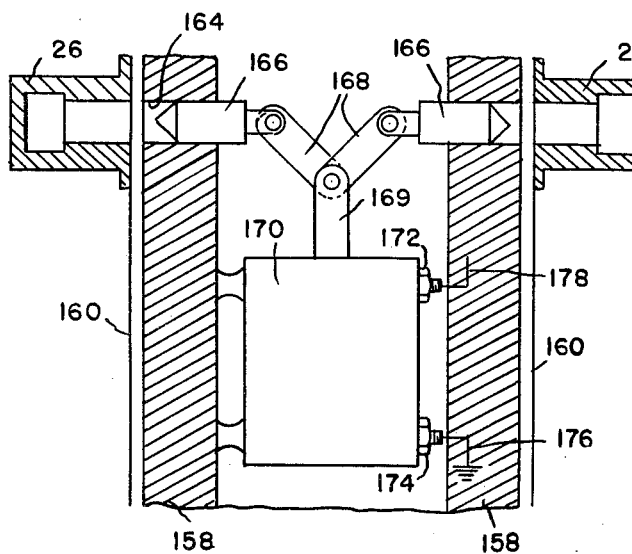
FIGURE 10 is a sectional view of solenoid actuated lock means applied to a four door vehicle.

Referring now to FIGURE 10 there is illustrated an arrangement designed particularly for use in conjunction with four-door vehicles having center pillars against which the free edge of a pair of doors engage. In this figure the two-door post is illustrated at 158 while the adjacent edges of the door are indicated at 160 and 162. The center door post or pillar 158 has guide openings 164 in which are slidably received the locking bolts 166. The bolts are connected through links 168 to the plunger 169 of the solenoid 170. The solenoid includes terminals 172 and 174 one of which is grounded as indicated at 176 and the other of which is connected by a line 178 to a control switch which may be any of the control switches illustrated in the embodiments of the invention previously described. The solenoid 170 of course includes the usual return spring so that when de-energized its armature or plunger 169 is retracted to the position shown in FIGURE 10, thus moving the bolts 166 to unlocked position.

The drawings and the foregoing specification constitute a description of the improved automobile door lock in such full, clear, cocise and exact terms as to enable any person skilled in the art to practice the invention, the scope of which is indicated by the appended claims.

What I claim as my invention is:

1. A completely automatic auxiliary door lock for an automobile having an engine provided with a manifold vacuum responsive ignition distributor, including a door locking bolt, actuating means for said bolt, and automatic control means for said actuating means including a vacuum connection to said distributor for energizing said actuating means only in response to distributor vacuum at engine speeds in excess of curb idle speed.

2. An auxiliary safety lock for an automobile having an internal combustion engine including an intake passage provided with a venturi, and an electrical system, said lock including a movable bolt, a bolt-actuating solenoid connected to said bolt, an electric control circuit including said solenoid connected to the electric system of the automobile, said control circuit including a vacuum operated switch responsive to venturi vacuum and effective to complete the electric control circuit to actuate said solenoid to engage said bolt only when said engine is operated at speeds in excess of the speed corresponding to curb idle operation.

3. Auxiliary safety lock structure for an automobile having an internal combustion engine, an electrical system including a generator, a generator cut-out relay and an ignition circuit, a source of pressure variable directly as engine speed and a pressure responsive ignition distributor connected to said source of pressure, said safety lock structure including a movable bolt, a bolt actuating solenoid operably associated with said bolt, an electric control circuit including said solenoid connected to the electric system of the automobile between the generator cut-out relay and the ignition circuit operable on completion to energize said solenoid to engage said bolt, pressure responsive switch means connected to the distributor and said electric control circuit operable only when said engine is operated at speeds in excess of the speed corresponding to "curb idle" operation to complete said electric control circuit, comprising a pair of bowl shaped housing members, each having an annular radially outwardly extending flange around the open side thereof, a flexible diaphragm held between said flanges, a pair of electric terminals secured within one of said housing members, a bridging electric conductor supported by said diaphragm within said one housing member for movement toward and away from said terminals, a vacuum line extending into said one housing member from said vacuum source through said distributor, and resilient means operable between said diaphragm and one housing member, the other of said housing members being open to atmospheric pressure.

References Cited in the file of this patent

UNITED STATES PATENTS

| | | |
|---|---|---|
| 1,761,513 | Arthur | June 3, 1930 |
| 1,829,312 | Thomas | Oct. 27, 1931 |
| 2,009,933 | Mallory | July 30, 1935 |
| 2,110,125 | Galloway | Mar. 8, 1938 |
| 2,115,643 | McClanahan | Apr. 26, 1938 |
| 2,250,014 | Fitz Gerald | July 22, 1941 |
| 2,314,815 | Brandt | Mar. 23, 1943 |
| 2,340,424 | Ott | Feb. 1, 1944 |
| 2,369,713 | Burgard | Feb. 20, 1945 |
| 2,410,998 | Reavis | Nov. 12, 1946 |
| 2,471,111 | Mallory | May 24, 1949 |
| 2,674,334 | Uberbacher | Apr. 6, 1954 |
| 2,695,685 | Jamison | Nov. 30, 1954 |